United States Patent [19]

Telle

[11] Patent Number: 5,150,223
[45] Date of Patent: Sep. 22, 1992

[54] COPIER WITH SINGLE PASS AUTO EXPOSURE

[75] Inventor: Lawrence B. Telle, Rochester, N.Y.

[73] Assignee: Eastman Kodak Company, Rochester, N.Y.

[21] Appl. No.: 443,543

[22] Filed: Nov. 30, 1989

[51] Int. Cl.$^5$ .............................. H04N 1/40
[52] U.S. Cl. .................... 358/448; 358/465; 358/464; 358/444; 358/461
[58] Field of Search ............... 358/401, 405, 406, 448, 358/461, 462, 464, 465, 466, 444, 404; 355/214, 208

[56] References Cited

U.S. PATENT DOCUMENTS

| | | | |
|---|---|---|---|
| 4,524,388 | 6/1985 | Abe et al. | 358/461 |
| 4,672,186 | 6/1987 | Van Tyne | 358/464 |
| 4,672,461 | 6/1987 | Yoshida | 358/466 |
| 4,779,106 | 10/1988 | Mills | 358/406 |
| 4,922,350 | 5/1990 | Rombola et al. | 358/465 |
| 4,926,252 | 5/1990 | Nagano | 358/78 |

Primary Examiner—Jin F. Ng
Assistant Examiner—Dov Popovici
Attorney, Agent, or Firm—Milton S. Sales

[57] ABSTRACT

An electronic copier includes a marking engine for forming a copy based on a supplied series of electrical signals, and a data monitor for selecting a threshold reflectance from the background reflectance of the original document. The image is processed according to the threshold reflectance selected by the data monitor, and the processed signal is applied to the marking engine. A scanner generates, during a single scan of a document, a series of electrical signals representative of the image content of the documents and applies the scanned signals to the data monitor and a full page image storage buffer.

8 Claims, 2 Drawing Sheets

COPIER WITH SINGLE PASS AUTO EXPOSURE

BACKGROUND OF THE INVENTION

1. Technical Field

This invention relates generally to electronic copiers, and more particularly to such copiers capable of image processing such as for example by object isolation by referencing the background of an image being copied.

2. Background Art

Object isolation of images being electronically copied often employs image segmentation by a thresholding technique wherein the image is partitioned into a finite number of disjoint (non-overlapping) picture elements, called pixels, each of which is represented as a pure binary quantity, i.e., object or background. Thresholding is particularly useful for images containing solid area objects resting upon a contrasting background. When using a threshold rule for image segmentation of positive images, one assigns all pixels at or above the threshold reflectance to the background. All pixels with reflectance below threshold fall inside the object.

It is desirable that the threshold reflectance be determined by an examination of the background level of the entire original document. So called "background referencing" techniques, wherein estimates of the background level are periodically updated so that the threshold reflectance is constantly being updated, are generally not suitable for document copiers because of the high incidents of artifacts produced.

Accordingly, it is generally desirable to select one threshold reflectance for the entire, or a substantial portion of the entire, original document. This of course requires that the reflectance levels over the whole document be considered before the image signal can be processed.

In the prior art, this is accomplished by pre-scanning the document to gather sufficient data regarding the various reflectances across the image so that a threshold reflectance can be determined. During a subsequent scan, the image signal is processed according to the threshold reflectance determined using the data collected during the first scan.

A copier's life is in part limited by the physical number of times the image is scanned, and the inconvenience of the operators is measured in part by the time duration they must wait to remove the original after pressing the start button. A copier which requires only a single scan to determine the threshold reflectance and to effect image processing according to the threshold reflectance would be very preferable to a copier which requires two or more scans for the same functions.

Another drawback to copiers which require a pre-scan to determine the threshold reflectance and a second scan to process the image as the image signal comes from the scanner is that there is no provision for producing a test print of the image as processed, and for then changing the threshold reflectance before a final print without rescanning the original document.

DISCLOSURE OF INVENTION

It is an object of the present invention to provide a copier with the capability to determine characteristics of the original document for purposes of image processing, to set image processing parameters, and to process the image signal according to the set parameters in but a single scan of the original document.

It is another object of the present invention to provide a copier with the capability to determine the overall background level of the original document, to select a threshold reflectance, and to process the image signal according to the selected threshold reflectance in but a single scan of the original document.

It is yet another object of the present invention to provide a copier with the capability to select a threshold reflectance according to the overall background level of the original document, to process the image signal according to the selected threshold reflectance for a test print, and to reprocess the image signal according to a modified threshold reflectance for a final print, all in but a single scan of the original document.

According to these and other objects, the present invention provides an electronic copier for reproducing original documents from electrical signals representative of the image content of the documents. The copier includes image forming means for forming a copy based on a supplied series of electrical signals. Data monitoring means determine a characteristic of the original document from a series of electrical signals representative of the image content of the documents. Image processing means are provided for processing electrical signals representative of the image content of the documents on the basis of the characteristic of the original document determined by the data monitoring means to improve the quality of the reproduction, and for applying the processed electrical signals to the image forming means. Memory means store a series of electrical signals representative of the image content of a document, and apply the stored electrical signals to the image processing means. Scanning means generate, during a single scan of a document, a series of electrical signals representative of the image content of the documents and apply the scanned signals to the data monitoring means and the memory means. Means retrieve the stored series of data signals from the memory means and apply them to the image processing means.

In a preferred embodiment of the present invention, the memory means is adapted to store electrical signals representative of the unmodified image content of the documents. The data monitoring means is adapted to select a threshold reflectance from the overall background reflectance level of the original document, and the image processing means is adapted to process the electrical signals according to the selected threshold reflectance in but a single scan of the original document. The image may be re-processed according to a modified threshold reflectance for a final print, all in but a single scan of the original document.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
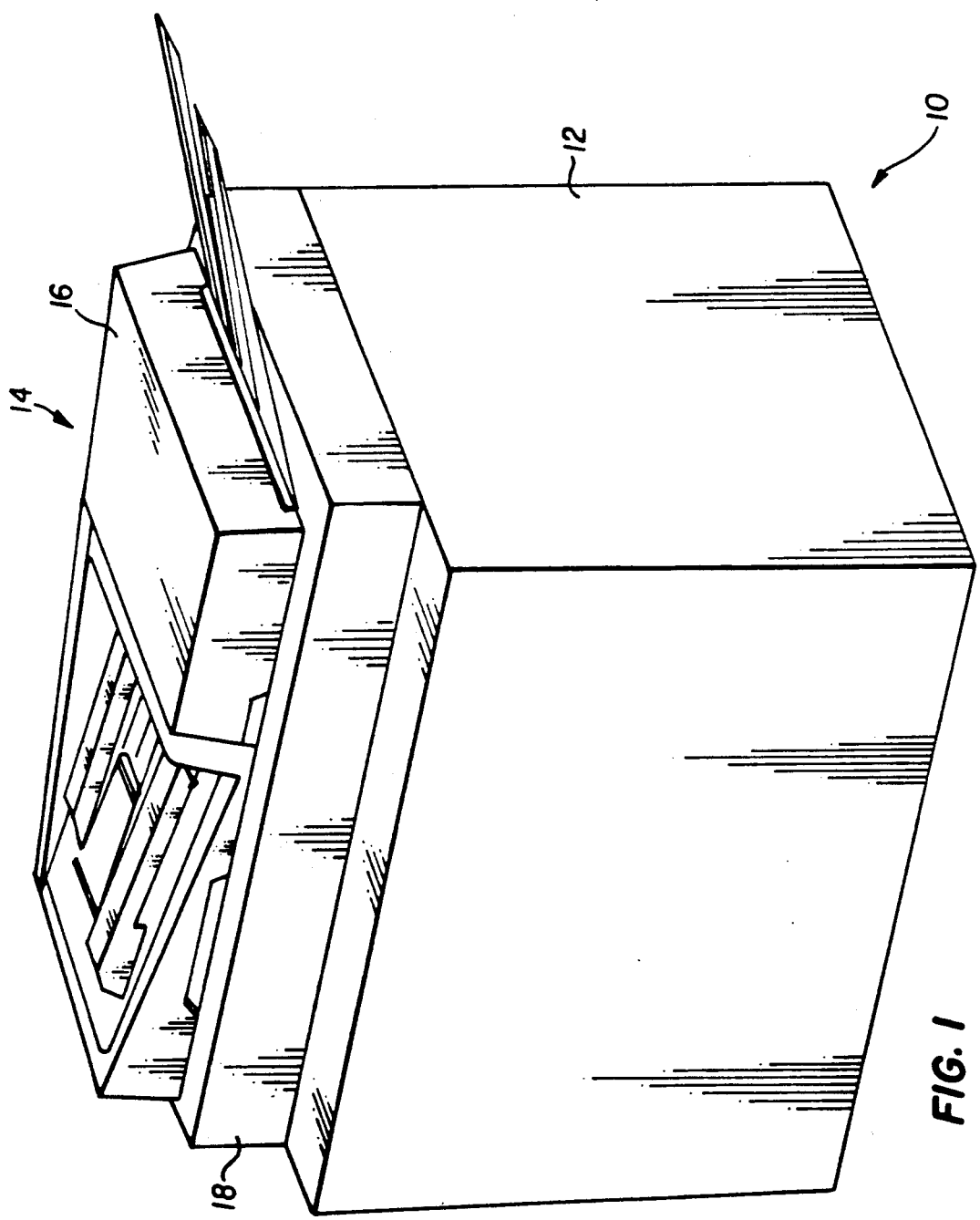
FIG. 1 is a perspective view of a copier according to one embodiment of the present invention.
Figure 2:
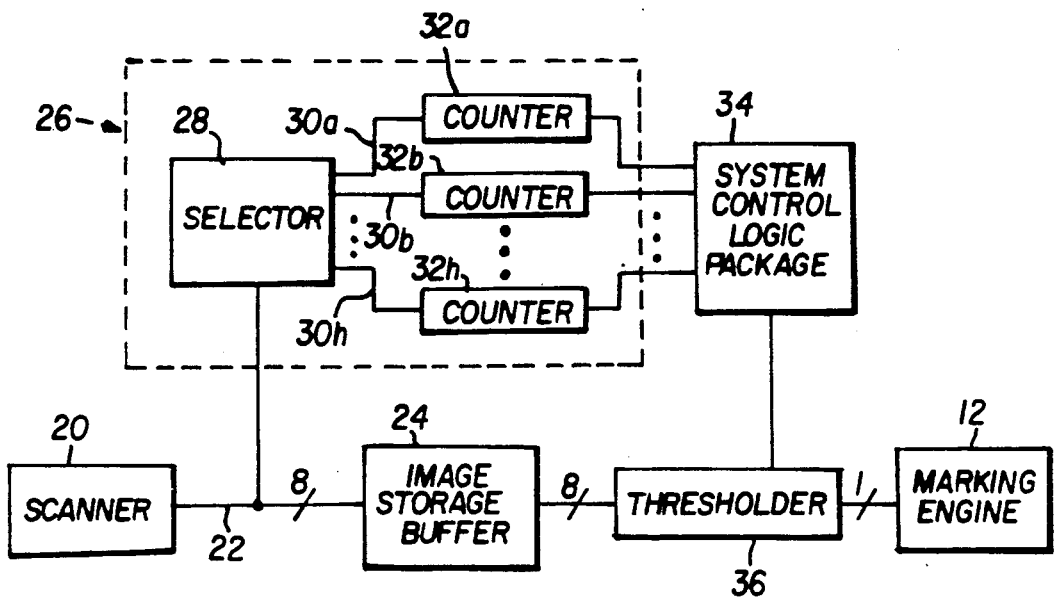
FIG. 2 is a schematic block diagram of the image data path of the copier of FIG. 1.

According to FIG. 1, a copier 10 includes a marking engine 12 and a document scanner 14. The document scanner produces a series of electrical signals representative of the image content of originals. Scanner 14 consists of an automatic document handler 16 for stream feeding multiple hard copy original pages past an optical system enclosed in an optics housing 18 to be automatically read by a scanning device 20 such as a linear array of solid-state charge-coupled devices (see FIG. 2). The scanning device scans the originals pages, converting their images to an image data stream of electrical signals. Preferably, scanning device 20 comprises a linear array of CCD's.

Image signals pass over a bus 22 unmodified for storage in a full page image buffer 24. By "unmodified" it is meant in a form in which the image content of the original can be retrieved. Image buffer 24 can retain the un-modified image until a test print has been run and accepted by the operator. In that way, image processing adjustments (as explained below) can be inspected and, if unacceptable, redone from the original image data.

As an original document is scanned into image buffer 24, the image signal passes pixel by pixel along bus 22 into a data monitor unit 26. The data monitor unit provides means for determining a characteristic of the original document for purposes of setting image process parameters. In the preferred embodiment, the parameters provide a threshold reflectance according to the image content of the area of interest, which area is usually a page of the original, but may be a portion of a page or several pages. According to the illustrated embodiment, data monitor 26 includes a selector unit 28 which receives the multiple bit data signal and outputs a signal over one of a plurality of paths 30a–30h according to the reflectance value of the signal.

For example, assume that each pixel of the original image is represented on bus 22 by a eight-bit binary word representing one of 256 reflectance levels (0–255). Assume also that there are eight paths 30a–30h from selector unit 28. Now, the path 30a–30h selected for a particular pixel will be determined by its reflectance level "R" as follows:

R between 0 and 31 = path 30a
R between 31 and 63 = path 30b
R between 64 and 95 = path 30c
R between 96 and 127 = path 30d
R between 128 and 159 = path 30e
R between 160 and 191 = path 30f
R between 192 and 223 = path 30g
R between 223 and 255 = path 30h Each of paths 30a–30h provides an input to one of eight counters 32a–32h, respectively. The counters accumulate the number of pixels of the image having a reflectance falling within their respective ranges. Thus, by comparing the counters, a system control logic package 34 can form a histogram of the reflectance levels of the pixels of the image. This function summarizes the gray level content of an image, and is, for each gray level, the number of pixels in the image that have that gray level.

Figure 3:
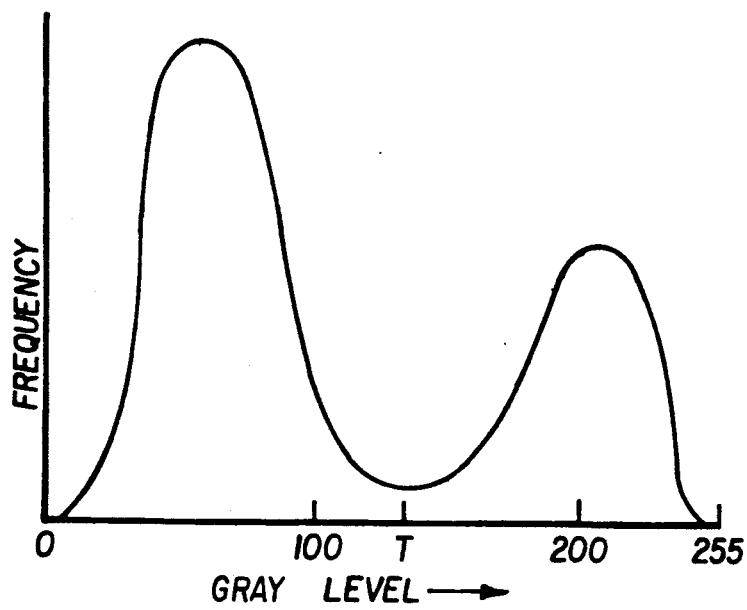
FIG. 3 is bimodal histogram of gray levels.

Suppose an image contains a dark object on a light background. FIG. 3 illustrates the appearance of the histogram of such an image. The dark pixels inside the object produce the rightmost peak in the histogram. The leftmost peak is due to the large number of light gray pixels in the background. The relatively few mid-gray pixels around the edge of the object produce the dip between the two peaks. A threshold gray level chosen in the area of the dip will produce a reasonable boundary for the object. Generally the gray level corresponding to the minimum between the two peaks is optimal for defining the boundary. Histograms and thresholding are discussed in *Digital Image Processing*; Kenneth R. Castleman; Prentice-Hall, Inc.; 1979; page 76. Once a threshold reflectance has been selected, its value is inputted to a thresholder 36.

Now, and without rescanning the original document, the image data can be read from image buffer 24 and sent a pixel at a time to marking engine 12 through thresholder 36. The reflectance value of the pixel is compared to the threshold reflectance stored in the thresholder. All pixels at or above the threshold reflectance are assigned to the object. All pixels with gray level below threshold fall outside the object. The resultant single bit value of the pixel is sent to the marking engine and the next pixel value is read from image buffer 24.

The first print of a page by the marking engine may be considered to be a test print. The operator, upon viewing the test print may decide that the threshold reflectance is too dark or too light in that excessive background may exist or image content may be lost, respectively. The operator may, with suitable controls, adjust the threshold reflectance up or down. A second test print, or a production print, may now be produced without rescanning the original document since the full image content remains in image buffer 24 until the next original document is scanned into the buffer.

The invention has been described in detail with particular reference to preferred embodiments thereof, but it will be understood that variations and modifications can be effected within the spirit and scope of the invention. For example, this specification has referred to object isolation by referencing object and background reflectances. It will be understood that referencing can equally be effected by means of transmittances or densities.

What is claimed is:

1. An electronic copier for reproducing original documents from electrical signals representative of an image content of the documents; said copier comprising:

image forming means for forming a copy based on a supplied series of electrical signals;

data monitoring means for determining a characteristic of the original document from a series of electrical signals representative of the image content of substantially the entire document;

image processing means for processing electrical signals representative of the image content of the documents on the basis of the characteristic of the original document determined by said data monitoring means to improve the quality of the reproduction, and for applying the processed electrical signals to said image forming means;

memory means for storing a series of electrical signals representative of the image content of a document, and for applying the stored electrical signals to said image processing means;

scanning means for generating, during a single scan of a document, a series of electrical signals representative of the image content of the documents and for applying the scanned signals to said data monitoring means and said memory means; and means for retrieving the stored series of electrical signals from said memory means and for applying the stored series of electrical signals to said image processing means.

2. An electronic copier as defined in claim 1 wherein said memory means is adapted to store electrical signals representative of an unmodified image content of the documents.

3. An electronic copier as defined in claim 1 wherein:
said data monitoring means is adapted to select a threshold reflectance from an overall background reflectance level of substantially the entire original document; and
said image processing means is adapted to process the electrical signals according to the selected threshold reflectance in said single scan of the original document.

4. An electronic copier as defined in claim 1 wherein:
said data monitoring means is adapted to select a threshold reflectance from an overall background reflectance level of substantially the entire original document; and
said image processing means is adapted to (1) process the electrical signals according to the selected threshold reflectance for production of a test print, and (2) re-process the electrical signals according to a modified threshold reflectance for a final print, in said single scan of the original document.

5. An electronic copier for reproducing original documents from electrical signals representative of an image content of the documents; said copier comprising:
scanning means for generating, during a single scan of a document, a series of electrical signals representative of the image content of the documents;
memory means for storing the series of electrical signals generated during said single scan of a document;
means for applying the scanned signals to said memory means;
data monitoring means for determining from substantially the entire scan of the document a characteristic of the original document from the series of electrical signals generated during said single scan of a document;
means for applying the scanned signals to said data monitoring means
image processing means for processing stored electrical signals on the basis on the basis of the characteristic of the original document determined by said data monitoring means to improve the quality of the reproduction;
image forming means for forming a copy based on a supplied series of processed electrical signals from said image processing means; and
means for retrieving the stored series of electrical signals from said memory means and for applying the stored series of electrical signals to said image processing means.

6. A process for reproducing original documents from electrical signals representative of an image content of the documents; said process comprising:
scanning a document to generate a series of electrical signals representative of the image content of the documents;
storing the series of electrical signals generated during a single scan of the document;
determining a characteristic of the original document from the series of electrical signals generated during said single scan of substantially the entire document;
retrieving the stored series of electrical signals;
processing the retrieved electrical signals on the basis of the determined characteristic of the original document to improve the quality of the reproduction; and
forming an image with the processed electrical signals.

7. A process for reproducing original documents from electrical signals representative of the image content of the documents as defined in claim 6 wherein:
said determining step includes selecting a threshold reflectance from an overall background reflectance level of substantially the entire original document; and
said processing step includes processing the electrical signals according to the selected threshold reflectance in said single scan of the original document.

8. A process for reproducing original documents from electrical signals representative of the image content of the documents as defined in claim 6 wherein:
said determining step includes selecting a threshold reflectance from an overall background reflectance level of the original document; and
said processing step includes (1) processing the electrical signals according to the selected threshold reflectance in said single scan of the original document, and (2) re-processing the electrical signals according to a modified threshold reflectance for a final print, in said single scan of the original document.

* * * * *